United States Patent [19]

Ramer

[11] Patent Number: 5,624,713
[45] Date of Patent: Apr. 29, 1997

[54] METHOD OF INCREASING LUBRICITY OF SNOW SKI BASES

[75] Inventor: Paul Ramer, Golden, Colo.

[73] Assignee: Zardoz LLC, Boulder, Colo.

[21] Appl. No.: 590,385

[22] Filed: Jan. 25, 1996

[51] Int. Cl.$^6$ ........................................................ B05D 5/08
[52] U.S. Cl. .......................................... 427/371; 427/393.5
[58] Field of Search .................................... 427/355, 371, 427/393.5; 106/3; 280/610, 28, 601–609; 472/88, 90

[56] References Cited

U.S. PATENT DOCUMENTS

| | | | |
|---|---|---|---|
| 3,445,392 | 5/1969 | Gumprecht et al. | 252/54 |
| 3,770,663 | 11/1973 | Ueki et al. | 260/2.5 B |
| 3,799,565 | 3/1974 | Burtis et al. | 280/16 |
| 3,810,874 | 5/1974 | Mitsch et al. | 260/75 H |
| 4,526,833 | 7/1985 | Burguette et al. | 428/336 |
| 4,529,826 | 7/1985 | Gambaretto | 570/142 |
| 4,657,279 | 4/1987 | Pascal et al. | 280/636 |
| 4,760,198 | 7/1988 | Bierschenk et al. | 568/615 |
| 5,114,482 | 5/1992 | Hertel | 106/270 |
| 5,131,674 | 7/1992 | Tokui et al. | 280/610 |
| 5,423,994 | 6/1995 | Traverso et al. | 252/58 |
| 5,466,743 | 11/1995 | Schamesberger | 524/462 |

FOREIGN PATENT DOCUMENTS

| | | |
|---|---|---|
| 49736A | 4/1982 | European Pat. Off. |
| 421303A2 | 4/1991 | European Pat. Off. |
| 83948A | 9/1993 | European Pat. Off. |
| 53-127041A | 11/1978 | Japan |
| 57-017674A2 | 1/1982 | Japan |
| 60-45683A | 3/1985 | Japan |

OTHER PUBLICATIONS

R.E. Banks, et al., *Organofluorine Chemistry—Principles and Commercial Applications*, ©1994 Plenum Press, NYC, NY, Chapter 20 "Perfluoropolyethers (PFPEs) from Perfluoroolefin Photooxidation", pp. 431–467. No Month Given.

"Krytox® Oils and Greases," Mar. 1996, Dupont Performance Lubricants, Deepwater, NJ.

"Krytox® Performance Lubricants—Technical Information", publ. Jul. 1994, DuPont Performance Lubricants, Deepwater, NJ.

Caporiccio, "A New Series of Lubricants for Magnetic Recording Media from Bifunctional Perfluoropolyether Derivatives", May 1986, San Jose, California, Symposium on Memory and Advanced Recording Technologies.

Translation, Flabbi et al, Tribologia e Lubrificazione, vol. XX, Dec. 1985, pp. 109–116.

D'Agostino et al, Tribology, vol. 21, No. 2, Apr. 1988, pp. 105–108.

Anderson et al, J. of Synthetic Lubrication, vol. 5, No. 3, 1988, pp. 199–214.

Cosmacini et al, Wear, vol. 108, 1986, pp. 269–283.

Caporiccio, "Perfluoropolyether Fluids: Properties and Applications", J. Fluorine Chem., 33(1–4), 314–20, 1986.

Paciorek, "Stability of Perfluoroalkylethers", J. Fluorine Chem., 67(2), 169–175, 1994.

*Primary Examiner*—Shrive Beck
*Assistant Examiner*—Erma Cameron
*Attorney, Agent, or Firm*—Carol W. Burton; Holland & Hart LLP

[57] ABSTRACT

A method of increasing the lubricity of snow skis is disclosed in which an effective amount of a non-functional perfluoropolyether is applied to the base of the snow skis. Preferably, the method includes application of a non-functional perfluoropolyether, where the perfluoropolyether is a liquid at room temperature, having a pour point below 5° F., a boiling point greater than 200° F., and an average molecular weight of from 1,000 to 15,000.

17 Claims, No Drawings

METHOD OF INCREASING LUBRICITY OF SNOW SKI BASES

BACKGROUND OF THE INVENTION

1. Field of the Invention

The present invention relates to the treatment of snow ski bases to increase lubricity of the ski during skiing. More particularly, the present invention relates to a method of treating sintered base snow skis to increase lubricity of the skis for an extended period without need for frequent retreating.

2. Description of the Prior Art

Sintered base snow skis are commonly employed in both competitive and recreational skiing. Sintered base skis typically have a polymer base, e.g., polyethylene base, which includes a thin polymer layer having pores throughout. This thin polymer layer is laminated in the manufacturing process onto the base of the ski. Such sintered base skis can contain one or more of such polymers combined on the ski base in order to provide optimal performance. As used herein, the term snow skis is intended to include snow skis, snow boards, and boards such as those used on snow mobiles, dog sleds and the like, and includes sintered base skis having one or more than one polymer layer laminated onto the bottom of the ski.

Snow skis, including sintered base skis, are typically waxed to reduce friction and to improve control and speed and accordingly, performance. The smoother the skis run on the snow, the easier they are to control, and the more consistent the skiing will be. Accordingly, ski waxes that impart improved smoothness to the ski as it traverses the snow provide an important safety advantage especially to novice and intermediate level skiers because of the improved responsiveness of the skis. Furthermore, waxing the ski fills the porous openings in the bottom of the ski and covers imperfections in the bottom of the ski surface which may affect the ski's performance.

Conventional and fluorinated waxes are made from fluorinated hydrocarbons. While these waxes generally are believed to not pose environmental concerns, they are typically applied hot and require a modest amount of energy for heating, as well as a source of that energy. Moreover, the hot irons and applicators pose a risk of to injury during use. Typically, optimal performance of waxes are limited to a narrow temperature range, with such ski waxes have an appreciable lifetime on the ski surface of approximately three days.

While waxing ski bases does provide some protection to ski bases with respect to wear and contamination of the ski bases by oils and foreign matter, a hot-waxed ski base will show mechanical wear in as little as two days of use. This type of wear causes the ski base to take on a white fuzzy appearance indicative of abrasion of the ski base surface and the formation of fine hairs of damaged ski base material. Wax cosmetically eliminates this condition by coating the hairs with wax and sticking them down to the base. As the wax wears off, however, the hairs reappear.

The degree of smoothness with which a ski traverses snow may be measured by the ski's lubricity. Waxes previously employed on snow skis have included a lubricity agent which, when applied with the wax to the bottom surface of the ski, increases the lubricity of the ski. One lubricity agent previously employed in ski waxes is a nonionic fluoroaliphatic polymeric ester commercially available under the tradename FC-740 from the Minnesota Mining and Manufacturing Company ("3M"), Industrial Chemical Products Division, St. Paul, Minn. When this agent is employed in a ski wax and applied to the ski surface, the lubricity of the ski is significantly increased when employed at optimal conditions, i.e., ambient temperatures of about 10° F. and below. However, at ambient temperatures above 10° F., the performance of waxes containing this lubricity agent, while still acceptable, are diminished as compared to the performance at 10° F. or below; possibly due to a decrease in lubricity with an increase in temperature.

U.S. Pat. No. 5,114,482 to Terry J. Hertal for WAX FOR USE WITH SINTERED BASE SNOW SKIS describes wax compounds and their use to increase lubricity of sintered base snow skis containing what is characterized as perfluoropolyether diols. These perfluoropolyether diols are functional compounds which include the chemically reactive diols. As disclosed in the Hertal patent, these compounds require a vehicle compatible with the perfluoropolyether diols. Moreover, because they are applied in a wax base, they present the same limitations to use found with ski waxes generally. The use of functional and non-functional perfluoropolyethers as lubricants for magnetic media is known. See, e.g., U.S. Pat. No. 4,526,833 to Burguette, et al., and Caporiccio, "A New Series of Lubricants for Magnetic Recording Media from Bifunctional Perfluoropolyether Derivative", symposium on Memory and Advanced Recording Technologies, San Jose, Calif. (1986).

Attempts have been made to apply liquids to ski bases to increase lubricity. Such attempts, notably with silicone or silicone-based liquids, have not been commercially successful. Silicones have proven to be problematical because of a tendency to migrate. The prevailing view is generally that liquids will not stay on a ski base long enough to increase lubricity during use.

In view of the above, there is a continuing need in competitive and recreational skiing for ski waxes having improved lubricity over those previously available. There is also a continuing need for ski waxes having a broad temperature range for optimal performance and ease of use as well as improved durability which are cost effective.

SUMMARY OF THE INVENTION

The present invention includes a method of applying the base of snow skis with an effective amount of a liquid, non-functional perfluoropolyether to improve the lubricity of the snow ski. Preferably, the non-functional perfluoropolyether is one which has an average molecular weight of 1,000 to 15,000, has a boiling point of greater than 200° F., and has a pour point of less than 5° F. More preferably, the perfluoropolyether is a poly(hexafluoropropylene oxide), having a preferred average molecular weight of 1,500. As used herein, the term non-functional is one which is generally non-chemically reactive.

Skis having bases which are treated using the method of the present invention exhibit increased lubricity for at least 10 days of use without need for additional treatment. Abrasion of ski bases is prevented in skis treated using the method of the present invention. Increased lubricity of the ski bases is achieved at colder temperatures of from 5° F. to 15° F.

DETAILED DESCRIPTION

The inventor of the present invention unexpectedly discovered that a single application of a small amount of a non-functional perfluoropolyether (PFPE) on a sintered base of a snow ski substantially increased lubricity of the ski over more than 10 days of skiing which included temperatures of 5° F. to 15° F. Abrasion of the treated ski bases after 10 days of skiing was substantially prevented.

Preferred non-functional PFPEs for use in the method of the present invention are liquids having a boiling point of greater than 200° F. and a pour point of less than 5° F. The preferred non-functional PFPEs range in average molecular weight from 1,000 to 15,000, with a most preferable average molecular weight of 1,500. Preferably, the non-functional PFPE is a liquid at and above −4° F., that is to say it is a liquid which does not appreciably evaporates at room temperature and ambient pressure. Preferably, the non-functional PFPE has a surface tension of about 14 dynes/centimeter$^2$, or less.

The preferred non-functional perfluoropolyethers include, but are not limited to non-functional perfluoropolyethers containing —OCF$_2$—, —OCF$_2$CF$_2$—, —OCF$_2$CF$_2$CF$_2$—, —OCF(CF$_3$)CF$_2$—, and combinations thereof and the like.

More particularly, the preferred non-functional PFPEs include (1) F[CF(CF$_3$)CF$_2$O]$_n$CF$_2$CF$_3$ (where n is from 5 to 90), referred to as poly(hexofluoropropylene oxide) and available from Monte Edison SPA of Milan, Italy, under the tradename Krytox™; (2) CF$_3$O[CF(CF$_3$)CF$_2$O]$_p$(CF$_2$O)$_q$Rf (where p+q is from 8 to 45, p/q is from 20 to 100, and Rf is selected from the group consisting of CF$_3$, C$_2$F$_5$ and C$_3$F$_7$), available under the trade name Fomblin Y™ from Monte Edison; (3) F(CF$_2$CF$_2$CF$_2$O)$_n$CF$_2$CF$_3$ (where n is from 5 to 90), available under the tradename Demnum™ from Monte Edison; and (4) CF$_3$O(CF$_2$CF$_2$O)$_r$(CF$_2$O)$_s$CF$_3$ (where r+s is from 40 to 180 and r/s is from 0.5 to 2.0), available under the tradename Fomblin Z™ from Monte Edison.

EXAMPLE I

A total of 0.6399 grams of a poly(hexofluoropropylene oxide) in a liquid form having an approximate average molecular weight of 1,500 was applied in a dropwise manner to the bases of a pair of 170 centimeter skis having a total surface area of approximately 27,200 cm$^2$. The liquid was distributed over the ski bases with a cloth. Thereafter, the skis were used for 10 days at an average of approximately 6 hours per day. Substantially increased lubricity was experienced and maintained, even when temperatures dropped to 5° F. to 15° F.

EXAMPLE II

Skis treated and skied as described above in Example I were retreated with the poly(hexafluoropropylene oxide) of Example I. To reapply the poly(hexafluoropropylene oxide), 0.29 grams of the liquid was applied to a cloth and wiped on the ski base. Application was deemed complete when the ski base darkened slightly. After treatment, the lubricity achieved as in Example I was again achieved.

In contrast to other wax base preparations which generally no longer provide any glide improvement or ski base protection when effectiveness is lost, when the non-functional liquid PFPEs described herein begin to lose their effectiveness, the reduction in glide is small and the ski base continues to be protected. Although the precise mechanism is not known, it believed that the non-functional PFPEs penetrate deeply into the ski base.

In addition to increasing lubricity, liquid non-functional PFPEs are believed to protect ski bases from wear and contamination by oils and foreign matter. Liquid non-functional PFPEs penetrate the ski base and help prevent subsequent ski base wear and contamination. Ski bases treated with liquid non-functional PFPEs showed essentially no ski base wear after twenty days of use. Although the precise mechanism by which liquid non-functional PFPEs act is not completely known, liquid non-functional PFPEs apparently decrease mechanical friction between the ski base and the snow to such a point that abrasion either does not occur or occurs very slowly.

Liquid non-functional PFPEs appear to not experience the lower speed thresholds experienced with conventional waxes. Ski having skis bases treated with PFPEs have been said to feel fast even when the skier is not moving forward. This is referred to as feeling "slippery" such as one feels when standing on wet ice with smooth shoes. Because there is no lower threshold, ski bases treated with liquid non-functional PFPEs are exceptionally fast for long gentle traverses where one would need to walk or use some technique for propulsion. Moreover, liquid non-functional PFPEs maintain this fast feeling up to speeds well in excess of 40 miles per hour, and over a broad range of temperatures and snow conditions.

Without being limited by any theory, it is believed that the non-functional PFPE is compatible with the polymer material employed in the sintered base skis. It is further believed that, when applied to the base of the ski, the liquid non-functional PFPE spreads to a thin uniform film on the surface of the ski as well as penetrating and filling the porous openings found in the ski's base. It is believed that the liquid non-functional PFPE repels water from the ski and accordingly is not readily removed during skiing. Additionally, it is believed that a portion of liquid non-functional PFPE incorporated into the pores of the skis with the initial treatment will slowly exude outward onto the surface of the ski thereby replenishing a portion of the liquid non-functional PFPE lost during skiing. This suggested phenomena would explain the prolonged lifetime of the treatment.

In an alternate embodiment of the present invention, non-functional PFPE is combined with a compatible solvent, which is defined herein as a solvent which fully dissolves the non-functional PFPE at desired concentrations, has a suitably high vapor pressure to evaporate quickly, and is environmentally friendly. An acceptable evaporation rate at ambient temperatures of from 27° F. to 77° F. is 10 minutes or less, with a preferred evaporation rate of 5 minutes or less and a most preferred evaporation rate of about 1 minute or less. Examples of suitable solvents include the group of fluorinated compounds available under the trade names of SF 2 and FC 72 available from Industrial Chemical Products Division of 3M in St. Paul, Minn. The determination of other suitable compatible vehicles can be readily conducted by one of ordinary skill in the art by first determining whether a selected vehicle has sufficient solute capability to dissolve the non-functional PFPE. The SF 2 is such an exemplary liquid vehicle which has a sufficiently high vapor pressure at ambient conditions so that upon application onto the ski base, the SF 2 readily evaporates, leaving the non-functional PFPE on the ski base. Under these conditions, the vehicle, while confined in a suitable container, for example a spray bottle, will be retained primarily in a liquid form. However, when sprayed, the high vapor pressure of the liquid vehicle will allow it to rapidly evaporate under ambient conditions. More particularly, when the SF 2 is sprayed at room temperature of approximately 70° F., it typically evaporates within about one minute.

The non-functional PFPE is preferably mixed with the compatible solvent by weight percent of non-functional PFPE of from 1% to 99%. In the preferred alternate embodiment, poly(hexafluoropropylene oxide) in a liquid form having an approximate average molecular weight of 1,500 is mixed with the SF 2 in a weight ratio of 1:1. The resulting solution is then placed into 1 oz. size spray bottle, but may also be packaged into bulk containers for shipping or other commercial packaging. It is preferred that the containers or packages be airtight, especially when the solvent has a high vapor pressure.

Presently preferred embodiments of the present invention and many of its improvements have been described with a degree of particularity. It should be understood that this description has been made by way of preferred example, and that the invention is defined by the scope of the following claims.

What is claimed is:

1. A method of increasing the lubricity of a snow ski having a sintered base, comprising the step of applying a non-functional perfluoropolyether to the base of the ski in an amount effective to increase the lubricity during subsequent use of the sintered base in comparison to the lubricity of a sintered base of another snow ski not so treated, wherein the non-functional perfluoropolyether is liquid at a temperature of 5° F.

2. The method of increasing the lubricity of a snow ski according to claim 1 wherein the perfluoropolyether has an average molecular weight of about 1,500.

3. The method of increasing the lubricity of a snow ski according to claim 1 wherein the perfluoropolyether has a boiling point greater than 200° F. and a pour point below 5° F.

4. The method of increasing the lubricity of a snow ski according to claim 1 wherein the perfluoropolyether is selected from the group consisting of:

$F(CF(CF_3)CF_2)_nCF_2CF_3$ (where n is from 5 to 90), $CF_3O(CF(CF_3)CF_2O)_p(CF_2O)_qRf$ (where p+q is from 8 to 45, p/q is from 20 to 100, and Rf is selected from the group consisting of $CF_3$, $C_2F_5$ and $C_3F_7$), $F(CF_2CF_2CF_2O)_nCF_2CF_3$ (where n is from 5 to 90), and $CF_3O(CF_2CF_2O)_r(CF_2O)_sCF_3$ (where r+s is from 40 to 180 and r/s is from 0.5 to 2.0).

5. The method of increasing the lubricity of a snow ski according to claim 1, wherein the application step further comprises the steps of:

applying the liquid perfluoropolyether to the ski base; and spreading the liquid perfluoropolyether on the ski base with a cloth over substantially all of the ski base.

6. The method of increasing the lubricity of a snow ski according to claim 1 wherein the perfluoropolyether has an average molecular weight of, from 1,000 to 15,000.

7. The method of increasing the lubricity of a snow ski according to claim 1 wherein the perfluoropolyether is a poly(hexafluoropropylene oxide).

8. The method of increasing the lubricity of a snow ski according to claim 7 wherein the poly(hexafluoropropylene oxide) has an average molecular weight of from 1,000 to 15,000.

9. The method of increasing the lubricity of a snow ski according to claim 7 wherein the poly(hexafluoropropylene oxide) has an average molecular weight of about 1,500.

10. The method of increasing the lubricity of a snow ski according to claim 7 wherein the perfluoropolyether has a boiling point greater than 200° C. and a pour point below 5° F.

11. The method of increasing the lubricity of a snow ski according to claim 7, wherein the application step further comprises the steps of:

applying the liquid perfluoropolyether to the ski base; and spreading the liquid perfluoropolyether on the ski base with a cloth over substantially all of the ski base.

12. The method of increasing the lubricity of a snow ski according to claim 1 wherein the perfluoropolyether has an average molecular weight of from 1,000 to 15,000, a boiling point greater than 200° F. and a pour point below 5° F., and wherein the application step further comprises the steps of:

applying the liquid perfluoropolyether to the ski base; and spreading the liquid perfluoropolyether on the ski base with a cloth over substantially all of the ski base.

13. The method of increasing the lubricity of a snow ski according to claim 12 wherein the perfluoropolyether has an average molecular weight of approximately 1,500.

14. The method of increasing the lubricity of a snow ski according to claim 12, wherein the perfluoropolyether is poly(hexafluoropropylene oxide).

15. The method of increasing the lubricity of a snow ski according to claim 14, wherein the poly(hexafluoropropylene oxide) has an average molecular weight of approximately 1,500.

16. A method of increasing the lubricity of a snow ski having a sintered base, comprising the step of applying to the base of the ski a solution containing a non-functional perfluoropolyether in an amount effective to increase the lubricity of the skis during subsequent use, wherein the non-functional perfluoropolyether is liquid at room temperature and is selected from the group consisting of:

$F[CF(CF_3)CF_2O]_nCF_2CF_3$ (where n is from 5 to 90), $CF_3O(CF(CF_3)CF_2O)_p(CF_2O)_qRf$ where p+q is from 8 to 45, p/q is from 20 to 100, and Rf is selected from the group consisting of $CF_3$, $C_2F_5$ and $C_3F_7$), $F(CF_2CF_2CF_2O)_nCF_2CF_3$ (where n is from 5 to 90), and $CF_3O(CF_2CF_2O)_r(CF_2O)_sCF_3$ (where r+s is from 40 to 180 and r/s is from 0.5 to 2.0).

17. The method according to claim 16 wherein the non-functional perfluropolyether has an average molecular weight of from 1,000 to 15,000.

* * * * *